(12) United States Patent
Kim et al.

(10) Patent No.: US 9,593,268 B2
(45) Date of Patent: Mar. 14, 2017

(54) ADHESIVE COMPOSITION FOR POLARIZING PLATE AND POLARIZING PLATE PREPARED USING THE SAME

(71) Applicants: Won Kim, Uiwang-si (KR); Eun Hwan Jeong, Uiwang-si (KR); Yi Eun Kim, Uiwang-si (KR)

(72) Inventors: Won Kim, Uiwang-si (KR); Eun Hwan Jeong, Uiwang-si (KR); Yi Eun Kim, Uiwang-si (KR)

(73) Assignee: CHEIL INDUSTRIES, INC., Gumi-Si, Kyeongsangbuk-Do (KR)

( * ) Notice: Subject to any disclaimer, the term of this patent is extended or adjusted under 35 U.S.C. 154(b) by 233 days.

(21) Appl. No.: 13/931,831

(22) Filed: Jun. 29, 2013

(65) Prior Publication Data

US 2013/0295383 A1 Nov. 7, 2013

Related U.S. Application Data

(63) Continuation of application No. PCT/KR2011/008602, filed on Nov. 11, 2011.

(30) Foreign Application Priority Data

Dec. 31, 2010 (KR) .................. 10-2010-0140040

(51) Int. Cl.
*C09J 133/08* (2006.01)
*C09J 7/02* (2006.01)
(Continued)

(52) U.S. Cl.
CPC ............. *C09J 133/08* (2013.01); *C09J 7/026* (2013.01); *C09J 133/04* (2013.01);
(Continued)

(58) Field of Classification Search
None
See application file for complete search history.

(56) References Cited

U.S. PATENT DOCUMENTS 4,063,002 A * 12/1977 Wilson, Jr. ............ C03C 27/048
428/34
5,837,089 A 11/1998 Magrum
(Continued)

FOREIGN PATENT DOCUMENTS

| CN | 1990802 | 7/2007 |
| CN | 101033380 A | 9/2007 |

(Continued)

OTHER PUBLICATIONS

International Search Report dated Aug. 20, 2012.
(Continued)

*Primary Examiner* — Coris Fung
*Assistant Examiner* — Thomas Mangohig
(74) *Attorney, Agent, or Firm* — Lee & Morse, P.C.

(57) ABSTRACT

An adhesive composition and a polarizing plate, the adhesive composition including an isocyanate curing agent and having a creeping distance decrease rate of 10% or less, wherein the creeping distance decrease rate is calculated by Equation 1:

Creeping distance decrease rate (%)=|(A−B)/A|×100,  [Equation 1]

wherein, in Equation 1, A and B are creeping distances of an adhesive layer prepared from the composition, when a force of 2.25 kg is applied to a polarizing plate at 25° C. for 1,000 seconds after the polarizing plate formed with the adhesive layer is attached to a glass plate and left at 35° C. and 45% RH for 24 hours and for 36 hours, respectively.

18 Claims, 1 Drawing Sheet

(51) Int. Cl.
*C09J 133/04* (2006.01)
*G02B 5/30* (2006.01)

(52) U.S. Cl.
CPC ........ *C08L 2312/00* (2013.01); *G02B 5/3025* (2013.01); *Y10T 428/2896* (2015.01)

(56) References Cited

U.S. PATENT DOCUMENTS

| | | |
|---|---|---|
| 2007/0055006 A1 | 3/2007 | Kim et al. |
| 2007/0166537 A1 | 7/2007 | Nagamoto et al. |
| 2009/0012202 A1 | 1/2009 | Jacobine et al. |
| 2010/0208343 A1* | 8/2010 | Yoshida ................ C08F 220/18 359/485.01 |

FOREIGN PATENT DOCUMENTS

| | | |
|---|---|---|
| CN | 101910346 A | 12/2010 |
| JP | 04-164959 A | 6/1992 |
| JP | 2008-063425 A | 3/2008 |
| JP | 2009-041034 A | 2/2009 |
| JP | 2010-049058 A | 3/2010 |
| JP | 2010-121118 A | 6/2010 |
| KR | 10-2007-0025980 A | 3/2007 |
| KR | 10 2007-0025980 A | 3/2007 |
| KR | 10-2007-0076469 A | 7/2007 |
| KR | 10-2009-0078614 A | 7/2009 |
| KR | 10-2010-0011179 A | 2/2010 |
| TW | I335932 | 1/2011 |
| WO | WO 2009/008470 A1 | 1/2009 |

OTHER PUBLICATIONS

USPTO Action mailed Jun. 30, 2014, in U.S. Appl. No. 13/613,070 wherein claims were provisionally rejected on the ground of nonstatutory double patenting over claims of the captioned application.

Taiwanese Office Action in TW 100142921, dated Sep. 18, 2013 (Kim, et al.).

Korean Office Action in KR 10-2010-0140040, dated Jul. 19, 2013 (Kim, et al.).

Office Action mailed Jan. 4, 2015 in corresponding Chinese Patent Application No. 201180063479.8.

Japanese Office Action dated Jun. 16, 2015 in Corresponding Japanese Patent Application No. 2013-547286.

* cited by examiner

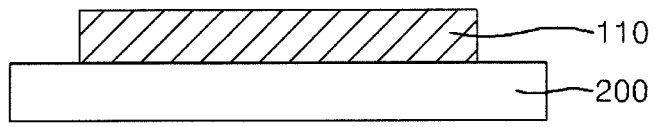

ADHESIVE COMPOSITION FOR POLARIZING PLATE AND POLARIZING PLATE PREPARED USING THE SAME

CROSS-REFERENCE TO RELATED APPLICATIONS

This application is a continuation of pending International Application No. PCT/KR2011/008602, entitled "Adhesive Composition for Polarizing Plate and Polarizing Plate Including the Same," which was filed on Nov. 11, 2011, the entire contents of which are hereby incorporated by reference.

Korean Patent Application No. 10-2010-0140040, filed on Dec. 31, 2010, in the Korean Intellectual Property Office, and entitled: "Adhesive Composition for Polarizing Plate and Polarizing Plate Including the Same," is incorporated by reference herein in its entirety.

BACKGROUND

1. Field

Embodiments relate to an adhesive composition for a polarizing plate and a polarizing plate prepared using the same.

2. Description of the Related Art

A polarizing plate may include a polarizing film and an adhesive layer on one or more surfaces of the polarizing film.

SUMMARY

Embodiments are directed to an adhesive composition for a polarizing plate and a polarizing plate prepared using the same.

The embodiments may be realized by providing an adhesive composition comprising an isocyanate curing agent and having a creeping distance decrease rate of 10% or less, wherein the creeping distance decrease rate is calculated by Equation 1:

$$\text{Creeping distance decrease rate (\%)} = |(A-B)/A| \times 100, \quad \text{[Equation 1]}$$

wherein, in Equation 1, A and B are creeping distances of an adhesive layer prepared from the composition, when a force of 2.25 kg is applied to a polarizing plate at 25° C. for 1,000 seconds after the polarizing plate formed with the adhesive layer is attached to a glass plate and left at 35° C. and 45% relative humidity (RH) for 24 hours and for 36 hours, respectively.

The isocyanate curing agent may be represented by Formula 1:

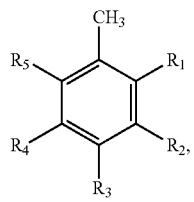

[Formula 1]

wherein, in Formula 1, $R_1$, $R_2$, $R_3$, $R_4$, and $R_5$ may each independently be selected from the group of hydrogen, $-(CH_2)_{n1}-NCO$, and $-(CH_2)_{n2}-NCO$, provided that two of $R_1$, $R_2$, $R_3$, $R_4$, and $R_5$ are $-(CH_2)_{n1}-NCO$ and $-(CH_2)_{n2}-NCO$, respectively, and n1 and n2 are each independently integers from 2 to 10.

The adhesive composition may have a gel fraction of 70% or higher in 36 hours after formation of the adhesive layer on a film.

The adhesive composition may have a viscosity change rate ($\Delta\eta$) of less than 10%, expressed as Equation 3:

$$\Delta\eta = |(b-a)|/a \times 100, \quad \text{[Equation 3]}$$

wherein, in Equation 3, a is an initial viscosity of the adhesive composition, and b is a viscosity of the adhesive composition after storage at 25° C. for 2 days.

The embodiments may also be realized by providing an adhesive composition comprising an isocyanate curing agent and having a difference in gel fraction of greater than 0 and less than 5% between gel fraction measured 4 days after formation of an adhesive layer and gel fraction measured 1 day after formation of the adhesive layer, wherein the gel fraction is expressed as Equation 2:

$$\text{Gel fraction (\%)} = D/C \times 100, \quad \text{[Equation 2]}$$

wherein, in Equation 2, C is a weight of the adhesive composition after storing a predetermined time, and D is a weight of insoluble components of the adhesive composition after storing for the predetermined time, depositing in ethyl acetate at 25° C. for 12 hours, and then drying for 12 hours in oven at 100° C.

The isocyanate curing agent is represented by Formula 1:

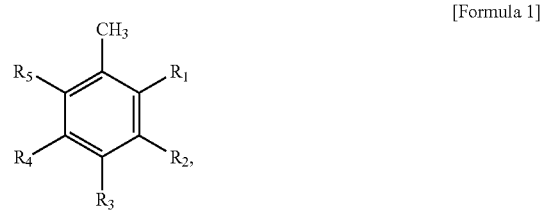

[Formula 1]

wherein, in Formula 1, $R_1$, $R_2$, $R_3$, $R_4$, and $R_5$ may each independently be selected from the group of hydrogen, $-(CH_2)_{n1}-NCO$, and $-(CH_2)_{n2}-NCO$, provided that two of $R_1$, $R_2$, $R_3$, $R_4$, and $R_5$ are $-(CH_2)_{n1}-NCO$ and $-(CH_2)_{n2}-NCO$, respectively, and n1 and n2 are each independently integers from 2 to 10.

The adhesive composition may have a gel fraction of 70% or higher in 36 hours after formation of the adhesive layer on a film.

The adhesive composition may have a viscosity change rate ($\Delta\eta$) of less than 10%, expressed as Equation 3:

$$\Delta\eta = |(b-a)|/a \times 100, \quad \text{[Equation 3]}$$

wherein, in Equation 3, a is an initial viscosity of the adhesive composition, and b is a viscosity of the adhesive composition after storage at 25° C. for 2 days.

The embodiments may also be realized by providing an adhesive composition including an acrylic copolymer; an isocyanate curing agent represented by Formula 1:

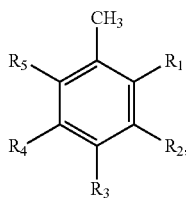

[Formula 1]

wherein, in Formula 1, $R_1$, $R_2$, $R_3$, $R_4$, and $R_5$ are each independently selected from the group of hydrogen, $-(CH_2)_{n1}-NCO$, and $-(CH_2)_{n2}-NCO$, provided that two of $R_1$, $R_2$, $R_3$, $R_4$, and $R_5$ are $-(CH_2)_{n1}-NCO$ and $-(CH_2)_{n2}-NCO$, respectively, and n1 and n2 are each independently integers from 2 to 10; and a crosslinking accelerator.

n1 and n2 may each independently be integers from 3 to 6.

The isocyanate curing agent may be present in an amount of 0.01 to 10 parts by weight, based on 100 parts by weight of the acrylic copolymer.

The crosslinking accelerator may include at least one selected from the group of a metallic catalyst and metal.

The crosslinking accelerator may be present in the composition in an amount of 0.01 to 1.5 parts by weight, based on 100 parts by weight of the acrylic copolymer.

The acrylic copolymer may include a copolymer of a hydroxyl group containing (meth)acrylic acid ester and (meth)acrylic acid alkyl ester.

The adhesive composition may further include a silane coupling agent.

The embodiments may also be realized by providing a polarizing plate including an adhesive layer prepared from the adhesive composition according to an embodiment.

BRIEF DESCRIPTION OF THE DRAWING

Features will become apparent to those of skill in the art by describing in detail exemplary embodiments with reference to the attached drawing in which:

FIG. 1 illustrates a polarizing plate according to an embodiment.

DETAILED DESCRIPTION

Example embodiments will now be described more fully hereinafter with reference to the accompanying drawing; however, they may be embodied in different forms and should not be construed as limited to the embodiments set forth herein. Rather, these embodiments are provided so that this disclosure will be thorough and complete, and will fully convey exemplary implementations to those skilled in the art. In the drawing FIGURE, the dimensions of layers and regions may be exaggerated for clarity of illustration. Like reference numerals refer to like elements throughout.

An embodiment provides an adhesive composition for a polarizing plate. The adhesive composition may include an isocyanate curing agent and may have a creeping distance decrease rate of 10% or less, as calculated by Equation 1, below. Within this range, a period for aging the adhesive composition may be shortened to 1 day (24 hour). This means that the composition may be cured within 1 day (24 hours). In an implementation, the creeping distance decrease rate may be 0 to 8%.

Creeping distance decrease rate refers to a decreasing rate of a creeping distance of an adhesive layer (prepared from the adhesive composition) when a force of 2.25 kg is applied to a polarizing plate at 25° C. for 1,000 seconds after the polarizing plate (formed with the adhesive layer) is attached to a glass plate and stored at 35° C. and 45% RH for a predetermined time.

The creeping distance decrease rate may be expressed as the following Equation 1.

$$\text{Creeping distance decrease rate (\%)} = |(A-B)/A| \times 100 \quad \text{[Equation 1]}$$

In Equation 1, A and B are creeping distances of an adhesive layer (prepared using the adhesive composition) when a force of 2.25 kg is applied to a polarizing plate at 25° C. for 1,000 seconds after the polarizing plate (formed with the adhesive layer) is attached to a glass plate and left at 35° C. and 45% RH for 24 hours and for 36 hours, respectively.

The creeping distance decrease rate may be measured on a uniform adhesive layer having a thickness of 25 μm obtained by depositing the adhesive composition on a polyethylene terephthalate (PET) release film and drying at 100° C. for 4 minutes.

Before measuring the creeping distance decrease rate, the polarizing plate formed with the adhesive layer may be stored under constant temperature and humidity conditions at 30±5° C. and 50±25% RH.

The adhesive composition may have a creeping distance decrease rate of 10% or less, calculated using a creeping distance of the adhesive layer left at 35° C. and 45 RH % for 24 hours and a creeping distance of the adhesive layer left at 35° C. and 45 RH % for 36 hours.

Another embodiment provides an adhesive composition that includes an isocyanate curing agent and has a difference in gel fraction of greater than 0 and less than 5% between gel fraction measured 4 days (96 hours) after formation of an adhesive layer and gel fraction measured 1 day (24 hours) after formation of an adhesive layer. In an implementation, the difference in gel fraction may be 1 to 3%.

The gel fraction may be expressed as Equation 2, below.

$$\text{Gel fraction (\%)} = D/C \times 100 \quad \text{[Equation 2]}$$

In Equation 2, C is a weight of the adhesive composition after storing for a predetermined time, and D is a weight of insoluble components of the adhesive composition after storing for the predetermined time, depositing in ethyl acetate at 25° C. for 12 hours, and then drying for 12 hours in oven at 100° C. The predetermined time is four days or one day.

The adhesive layer may be formed by a suitable method. For example, the adhesive layer may be formed by applying the adhesive composition to a PET release film and drying at 60 to 100° C. for 1 to 4 minutes. The adhesive layer may have a thickness of 5 to 30 μm, without being limited thereto.

The adhesive composition may have a gel fraction of 70% or more, measured 36 hours after formation of the adhesive layer on a film.

In an implementation, the adhesive composition may have a viscosity change rate ($\Delta\eta$) of less than 10%. The viscosity change may be expressed as Equation 3, below.

$$\Delta\eta = |(b-a)|/a \times 100 \quad \text{[Equation 3]}$$

In Equation 3, a is an initial viscosity, and b is a viscosity after storage at 25° C. for 2 days. Viscosity may be measured by a viscometer (Brookfield LVDV-II, Spindle No. 63, 6330 rpm) at 25° C., without being limited thereto.

The adhesive composition having such physical properties according to the embodiments may include, e.g., an acrylic copolymer; an isocyanate curing agent represented by Formula 1, below, and a crosslinking accelerator.

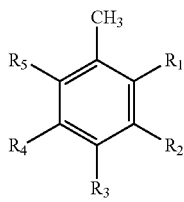

[Formula 1]

In Formula 1, $R_1$, $R_2$, $R_3$, $R_4$, and $R_5$ may each independently selected from the group of hydrogen, —$(CH_2)_{n1}$—NCO, and —$(CH_2)_{n2}$—NCO, wherein n1 and n2 may each independently be integers from 2 to 10. In an implementation, two of $R_1$, $R_2$, $R_3$, $R_4$, and $R_5$ may be —$(CH_2)_{n1}$—NCO and —$(CH_2)_{n2}$—NCO, respectively. For example, one of $R_1$, $R_2$, $R_3$, $R_4$, and $R_5$ may be —$(CH_2)_{n1}$—NCO, and another of $R_1$, $R_2$, $R_3$, $R_4$, and $R_5$ may be —$(CH_2)_{n2}$—NCO.

Acrylic Copolymer

The acrylic copolymer may include a copolymer of (meth)acrylic monomers having a hydroxyl group that is reactive with an isocyanate curing agent. For example, the acrylic copolymer may be a copolymer of a hydroxyl group containing (meth)acrylic acid ester and (meth)acrylic acid alkyl ester. The acrylic copolymer may have a weight average molecular weight of 400,000 to 2,500,000 g/mol, e.g., 800,000 to 2,000,000 g/mol. Within this range, excellent durability in high-temperature and high-humidity conditions may be obtained and an adhesive may have proper coatability.

The hydroxyl group containing (meth)acrylic acid ester may be a (meth)acrylic ester that includes a hydroxyl group at a terminus or in the ester structure, has a C1 to C20 alkyl group, and is copolymerizable with (meth)acrylic acid alkyl ester. For example, the hydroxyl group containing (meth)acrylic acid ester may include at least one selected from the group of 2-hydroxyethyl(meth)acrylate, 4-hydroxybutyl (meth)acrylate, 2-hydroxypropyl(meth)acrylate, 2-hydroxybutyl(meth)acrylate, 6-hydroxyhexyl meth)acrylate, 1,4-cyclohexanedimethanol mono(meth)acrylate, 1-chloro-2-hydroxypropyl(meth)acrylate, diethylene glycol mono(meth)acrylate, 1,6-hexanediol mono(meth)acrylate, pentaerythritol tri(meth)acrylate, dipentaerythritol penta(meth)acrylate, neopentylglycol mono(meth)acrylate, trimethylolpropane di(meth)acrylate, trimethylolethane di(meth)acrylate, 2-hydroxy-3-phenyloxypropyl(meth)acrylate, 4-hydroxycyclohexyl(meth)acrylate, 2-hydroxy-3-phenyloxy(meth)acrylate, 4-hydroxycyclohexyl(meth)acrylate, and cyclohexane dimethanol mono(meth)acrylate. The hydroxyl group containing (meth)acrylic acid ester may be present in the acrylic copolymer in an amount of 0.1 to 10 wt %, e.g., 1 to 8 wt %.

The (meth)acrylic acid alkyl ester may be a (meth)acrylic acid ester having a linear or branched alkyl group with 1 to 20 carbon atoms in the ester moiety. For example, the (meth)acrylic acid alkyl ester may include at least one selected from the group of methyl(meth)acrylate, ethyl (meth)acrylate, n-propyl(meth)acrylate, iso-propyl(meth)acrylate, n-butyl(meth)acrylate, t-butyl(meth)acrylate, iso-butyl(meth)acrylate, pentyl(meth)acrylate, hexyl(meth)acrylate, heptyl(meth)acrylate, octyl(meth)acrylate, nonyl (meth)acrylate, decyl(meth)acrylate, dodecyl(meth)acrylate, and lauryl(meth)acrylate. The alkyl group containing (meth)acrylic acid ester may be present in the acrylic copolymer in an amount of 90 to 99.9 wt %, e.g., 92 to 99 wt %.

In addition to the hydroxyl group containing (meth)acrylic acid ester and the (meth)acrylic acid alkyl ester, the acrylic copolymer may further include a copolymerizable monomer. For example, the acrylic copolymer may further include at least one selected from the group of acrylic acid, methacrylic acid, an acrylic acid dimer, itaconic acid, maleic acid, and maleic anhydride.

The acrylic copolymer may be prepared by a suitable method, e.g., solution polymerization, photopolymerization, bulk polymerization, or emulsion polymerization. For example, the acrylic copolymer may be prepared by solution polymerization at 50 to 140° C. Here, a general initiator may be used, e.g., azo polymerization initiators, such as azobisisobutyronitrile and azobiscyclohexanecarbonitrile; and/or peroxide initiators, such as benzoyl peroxide and acetyl peroxide.

Isocyanate Curing Agent

The isocyanate curing agent may have a structure represented by Formula 1, below.

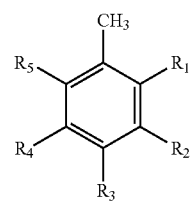

[Formula 1]

In Formula 1, $R_1$, $R_2$, $R_3$, $R_4$, and $R_5$ may each independently selected from the group of hydrogen, —$(CH_2)_{n1}$—NCO, and —$(CH_2)_{n2}$—NCO, and n1 and n2 may each independently be integers from 2 to 10. In an implementation, two of $R_1$, $R_2$, $R_3$, $R_4$, and $R_5$ may be —$(CH_2)_{n1}$—NCO and —$(CH_2)_{n2}$—NCO, respectively. For example, one of $R_1$, $R_2$, $R_3$, $R_4$, and $R_5$ may be —$(CH_2)_{n1}$—NCO, and another of $R_1$, $R_2$, $R_3$, $R_4$, and $R_5$ may be —$(CH_2)_{n2}$—NCO.

In an implementation, n1 and n2 may each independently be integers from 3 to 6. In an implementation, $R_1$ and $R_5$ may be —$(CH_2)_{n1}$—NCO and —$(CH_2)_{n2}$—NCO, respectively, and $R_2$ to $R_4$ may be hydrogen. In an implementation, —$(CH_2)_{n1}$—NCO and —$(CH_2)_{n2}$—NCO may be the same.

For example, the isocyanate curing agent may be 2,6-bis (butyl isocyanate)toluene.

The isocyanate curing agent may have an alkylene group present between a benzene ring and an NCO functional group to increase a degree of freedom of the NCO and to reduce introduction of electrons to a carbon of the carbonyl (CO) of the NCO. As a result, nucleophilic reaction may be accelerated between a hydroxyl group of the acrylic copolymer and the NCO in the presence of a metallic catalyst, thereby remarkably reducing an aging time of the adhesive.

In order to obtain sufficient heat resistance due to cohesion of the acrylic adhesive, the curing agent may generally be present in an amount of 0.01 to 10 parts by weight, based on 100 parts by weight of the acrylic copolymer. Within this range, the adhesive may have excellent flexibility and curing rate may be adjusted. In an implementation, the amount may be 0.1 to 2 parts by weight.

Crosslinking Accelerator

The crosslinking accelerator may serve as a catalyst to accelerate crosslinking of the acrylic copolymer and the isocyanate curing agent. The crosslinking accelerator may include at least one selected from the group of a metallic catalyst and metal.

The crosslinking accelerator may include, e.g., a tin compound, a zinc compound, an amine compound, a titanium compound, a bismuth compound, and/or an aluminum compound. In an implementation, the crosslinking accelerator may include a tin compound. Examples of the tin compound as the crosslinking accelerator may include bivalent or tetravalent organic tin compounds, such as dibutyltin dilaurate, dioctyltin dilaurate, dibutyltin bis(acetylacetonate), dibutyltin oxide, dibutyltin maleate, and dibutyltin dimaleate.

Examples of the zinc compound may include zinc oxide, zinc ammonium carbonate, zinc stearate, zinc naphthenate, and zinc 2-ethylhexanoate. Among these compounds, at least one crosslinking accelerator may be used, without being limited thereto.

The crosslinking accelerator may be present in an amount of 0.01 to 1.5 parts by weight, e.g., 0.05 to 1 part by weight, based on 100 parts by weight of the acrylic copolymer.

The adhesive composition may further include a silane coupling agent. The silane coupling agent may help enhance contact stability when the adhesive composition comes in contact with a glass substrate, thereby improving heat resistance and moisture resistance. Further, the silane coupling agent may help improve adhesion reliability when the adhesive is left in high-temperature and/or high-humidity conditions for a long time.

The silane coupling agent may include a suitable silane coupling agent that includes, e.g., a vinyl group or a mercapto group. For example, the silane coupling agent may include at least one selected from the group of a polymerizable unsaturated group containing silicon compound, such as vinyltrimethoxysilane, vinyltriethoxysilane, and (meth)acryloxypropyltrimethoxysilane; a silicon compound having an epoxy structure, such as γ-epoxypropyltrimethoxysilane, 3-glycidoxypropyltrimethoxysilane 3-glycidoxypropylmethyldimethoxysilane and 2-(3,4-epoxycyclohexyl)ethyltrimethoxysilane; an amino group containing silicon compound, such as 3-aminopropyltrimethoxysilane, N-(2-aminoethyl)-3-aminopropyltrimethoxysilane and N-(2-aminoethyl)-3-aminopropylmethyldimethoxysilane; and 3-chloropropyltrimethoxysilane, without being limited thereto. The silane coupling agent may be present in an amount of 0.001 to 5 parts by weight, e.g., 0.005 to 1 part by weight, based on 100 parts by weight of the acrylic copolymer. Within this range, adhesion may not deteriorate in high-temperature and high-humidity conditions, separation or bubbles may not occur, and excellent repeeling and optical properties may be obtained.

In addition to the aforementioned components, the adhesive composition may further include at least one additive selected from the group of a solvent, a curing agent, a UV stabilizer, an antioxidant, a coloring agent, a reinforcing agent, a filler, an antifoaming agent, a surfactant, and a plasticizer. The adhesive composition including the above components may be prepared by a suitable method using suitable additives.

Another embodiment provides a polarizing plate including an adhesive layer prepared from the adhesive composition. FIG. 1 illustrates a polarizing plate according to an embodiment. The polarizing plate may include a polarizing film 200 and an adhesive layer 110 on one or opposite sides of the polarizing film 200. The adhesive layer 110 may be prepared from the adhesive composition. Also, a protective film can be formed between the polarizing film and the adhesive layer.

The polarizing film or polarizing element is not particularly limited. For example, the polarizing film may include a film prepared by adding a polarizing component, such as iodine, to a polyvinyl alcohol resin film and elongating the film. Examples of polyvinyl alcohol resins may include polyvinyl alcohol, polyvinyl formal, polyvinyl acetal, and an ethylene vinyl acetate copolymer hydrolysate. A thickness of the polarizing film is not particularly limited.

The polarizing plate according to an embodiment may be a multilayer film in which a protective film is stacked on one side or opposite sides of the polarizing film, wherein the protective film may be a cellulose film, such as a triacetyl cellulose film, or a polyester film, such as a polycarbonate film and a polyethylene terephthalate (PET) film. A thickness of the protective film is also not particularly limited.

A method of forming the adhesive layer on the polarizing film is not particularly limited. For example, the adhesive layer may be formed by a method of depositing and drying the adhesive composition on the polarizing film, by a method of depositing and drying the adhesive composition on a release film and then transferring the adhesive layer on the release film to the surface of the polarizing film and aging, etc., without being limited thereto.

The polarizing plate may further include at least one functional layer selected from the group of a protective layer, a reflective layer, an anti-glare layer, a phase difference plate, a wide viewing angle compensation film, and a brightness enhancement film. The adhesive layer prepared from the adhesive composition according to an embodiment may be attached to each of the above functional layers.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

EXAMPLES

Preparative Example

Preparation of Acrylic Copolymer 1.0 part by weight of 4-hydroxybutyl acrylate and 99 parts by weight of n-butyl acrylate were placed in a 1-L reactor equipped with a cooling system to reflux under nitrogen gas and to facilitate temperature adjustment. 120 parts by weight (based on 100 parts by weight of the acrylic copolymer) of ethyl acetate was added thereto. After removing oxygen by purging nitrogen gas for 60 minutes, the reactor was maintained at 60° C., and 0.03 parts by weight (based on 100 parts by weight of the acrylic copolymer) of 2,2'-azobisisobutyronitrile (AIBN) as a reaction initiator diluted with ethyl acetate at a concentration of 45% was added to the reactor. Reaction was conducted at 60° C. for 8 hours, thereby producing an acrylic copolymer. The obtained acrylic copolymer had a weight average molecular weight of 1,600,000 g/mol (based on a polystyrene standard).

Example 1

100 parts by weight of the acrylic copolymer produced in the Preparative Example, 0.125 parts by weight of 2,6-bis (butyl isocyanate)toluene (FCH-50, Soken Chemical & Engineering), and 0.05 parts by weight of dibutyltin dilaurate (Accelerator S, Soken Chemical & Engineering) were dissolved in methyl ethyl ketone, thereby preparing an adhesive composition.

Example 2

100 parts by weight of the acrylic copolymer produced in the Preparative Example, 0.125 parts by weight of 2,6-bis (butyl isocyanate)toluene (FCH-50, Soken Chemical & Engineering), 0.05 parts by weight of dibutyltin dilaurate (Accelerator S, Soken Chemical & Engineering), and 0.3 parts by weight of γ-epoxypropyltrimethoxysilane (KBM403, Shin-Etsu Chemical) were dissolved in methyl ethyl ketone, thereby preparing an adhesive composition.

Examples 3 and 4

Adhesive compositions were prepared in the same manner as in Example 2 except that the content of dibutyltin dilaurate was changed as listed in Table 1, below.

Comparative Examples 1 and 2

Adhesive compositions were prepared in the same manner as in Example 3 except that an adduct of tolylene diisocyanate and trimethylolpropane (L-45, Soken Chemical & Engineering) and an adduct of xylene diisocyanate and trimethylolpropane (TD-75, Soken Chemical & Engineering) were used instead of 2,6-bis(butyl isocyanate)toluene as a curing agent.

release film and dried in a forced circulation hot-air dryer at 100° C. for 4 minutes, thereby obtaining a uniform adhesive layer having a thickness of 25 µm. The prepared adhesive layer was bonded to a 185 µm-thick polarizing film to produce a polarizing plate. The polarizing plate was attached to a glass plate to have a 1.5 cm×1.5 cm bonded area and stored in a thermo-hygrostat at 35° C. and 45% RH. The polarizing plates were removed at an interval of 12 hours and evaluated as to a creeping distance of the adhesive layer when a force of 2.25 kg was applied at 25° C. for 1,000 seconds using a Texture analyzer (TA-XT plus, Stable Micro System). Using the results, a creeping distance decrease rate (%) was calculated.

Creeping distance decrease rate (%)=|(A−B)/A|×100

(A and B were creeping distances of the adhesive layer (prepared from the adhesive composition) when a force of 2.25 kg was applied to a polarizing plate at 25° C. for 1,000 seconds after the polarizing plate formed with the adhesive layer is attached to a glass plate and left for a time of t and for a time of t+a, respectively, wherein 0≤t≤100 and 0<a≤100.)

Creeping distance decrease rate after 24 hours=
(Creeping distance after 12 hours−Creeping distance after 24 hours)/Creeping distance after 12 hours×100)   a.

Creeping distance decrease rate after 36 hours=
(Creeping distance after 24 hours−Creeping distance after 36 hours)/Creeping distance after 24 hours×100)   b.

TABLE 1

(Unit: parts by weight)

| | Example 1 | Example 2 | Example 3 | Example 4 | Comparative Example 1 | Comparative Example 2 |
|---|---|---|---|---|---|---|
| Acrylic copolymer | 100 | 100 | 100 | 100 | 100 | 100 |
| Isocyanate (A) | 0.125 | 0.125 | 0.125 | 0.125 | — | — |
| curing (B) | — | — | — | — | 0.125 | — |
| agent (C) | — | — | — | — | — | 0.125 |
| Crosslinking accelerator | 0.125 | 0.125 | 0.5 | 1.0 | 0.125 | 0.125 |
| Silane coupling agent | — | 0.3 | 0.3 | 0.3 | 0.3 | 0.3 |

*(A): 2,6-bis(butyl isocyanate)toluene
(B): Adduct of tolylene diisocyanate (TDI) and trimethylolpropane
(C): Adduct of xylene diisocyanate (XDI) and trimethylolpropane The prepared adhesive compositions were evaluated as to viscosity change, creeping distance decrease rate, and gel fraction, and results are listed in Table. 2, below.

<Methods of Evaluation of Physical Properties>

1. Viscosity Change

The adhesive compositions prepared in the Examples and Comparative Examples were evaluated as to initial viscosity (a) and viscosity (b) after storage at 25° C. for 2 days using a viscometer (Brookfield LVDV-11, Spindle No. 63, 6330 rpm) at 25° C. Using these data, a viscosity change rate (%, Δη−|(b−a)|/a×100) was calculated. Viscosity change was evaluated as follows: ○ if Δη<10%, Δ if 10%≤Δη<20, and x if Δη≥20%.

2. Creeping Distance Decrease Rate

Each of the adhesive compositions prepared in the Examples and Comparative Examples was applied to a PET Creeping distance decrease rate after 96 hours=
(Creeping distance after 24 hours−Creeping distance after 96 hours)/Creeping distance after 24 hours×100   c.

When measuring a creeping distance decrease rate after 24 hours, A is a creeping distance after 24 hours.

3. Gel Fraction

Each of the adhesive compositions prepared in the Examples and Comparative Examples was applied to a PET release film and dried in a forced circulation hot-air dryer at 100° C. for 4 minutes, thereby obtaining a uniform adhesive layer having a thickness of 25 µm. A release film was stacked on the adhesive layer, thereby manufacturing transfer tapes. The transfer tapes were stored in a thermo-hygrostat at 35° C. and 45% RH. The transfer tapes in storage were removed at an interval of 12 hours and cut into 1.5 cm×1.5 cm pieces.

The weight (C) of the piece was measured. The cut transfer tape was deposited in ethyl acetate at 25° C. for 12 hours, and then taken out and dried in an oven at 100° C. for 12 hours, followed by measurement of the weight (D). Using (C) and (D), a gel fraction was calculated by Equation 2, below.

Gel fraction (%)=$D/C$×100.    [Equation 2]

(C was the weight of the adhesive composition after storing a predetermined time, and D was the weight of insoluble components of the adhesive composition after storing for the predetermined time, depositing in ethyl acetate at 25° C. for 12 hours, and drying for 12 hours in oven at 100° C.).

TABLE 2

| | | Example 1 | Example 2 | Example 3 | Example 4 | Comparative Example 1 | Comparative Example 2 |
|---|---|---|---|---|---|---|---|
| Viscosity change | | ○ | ○ | ○ | ○ | ○ | ○ |
| Creeping distance decrease rate (%) | After 12 hours | — | — | — | — | — | — |
| | After 24 hours | 22 | 4.5 | 4.5 | 3 | 36 | 35 |
| | After 36 hours | 8 | 0 | 0 | 0 | 11 | 22 |
| | After 96 hours | 0 | 0 | 0 | 0 | 0 | 5 |
| Gel fraction (%) | After 24 hours | 67 | 72 | 71 | 72 | 65 | 65 |
| | After 36 hours | 70 | 72 | 71 | 73 | 68 | 65 |
| | After 96 hours | 70 | 73 | 72 | 73 | 70 | 71 |

As may be seen in Table 2, the adhesive composition according Examples 1 to 4 were cured within a remarkably shortened time. The adhesive compositions including the isocyanate curing agent according to Examples 1 to 4 had a low creeping distance decrease rate for the same time, as compared with the adhesive compositions containing TDI or XDI as a curing agent according to Comparative Examples 1 and 2, and had a gel fraction of 70% or higher after 36 hours. Further, the adhesive compositions according to Examples 1 to 4 exhibited a minimal change in gel fraction after 36 hours. According to Table 2, in Examples 1-4, the difference between the gel fraction after 96 hours and the gel fraction after 24 hours was less than 5%. Thus, Examples 1-4 could shorten a curing period and improve temporal stability and productivity.

By way of summation and review, as an adhesive for a polarizing plate, an adhesive composition may be one in which an acrylic polymer (having a functional group), a curing agent (for reacting with the functional group to form a three-dimensional crosslinking structure), and a silane coupling agent are dissolved in an organic solvent. In the adhesive for the polarizing plate, a hydroxyl group or a carboxyl group of the acrylic polymer may be combined with an isocyanate group of a polyisocyanate compound or an epoxy group of a glycidyl compound as a curing agent to form a three-dimensional structure, thereby bonding a glass substrate to a polarizing plate.

An adhesive composition for a polarizing plate may be used for an expensive liquid crystal display (LCD). Thus, an adhesive-coated roll-shaped product in manufacture (with a structure of polarizing plate-adhesive layer-release film or release film-adhesive layer-release film) may be stored in an aging room at 20 to 50° C. for 3 to 7 days to cross-link the adhesive in order to have satisfactory performance. Then, the product may be cut into a proper size and attached to a liquid crystal cell after removing the release film. However, this process may require storage of many products depending on a storage period in an aging room, and thus a considerable cost of the aging room may be involved.

The embodiments provide an adhesive composition for a polarizing plate that shortens an aging period and/or optimally has a high curing rate so as not to require an aging room to improve temporal stability and productivity.

The embodiments provide an adhesive composition for a polarizing plate, the composition including an isocyanate curing agent having a particular structure and shortening a curing period to thereby improve temporal stability and productivity.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An adhesive composition comprising an isocyanate curing agent and an acrylic copolymer, and having a creeping distance decrease rate of 10% or less, wherein the creeping distance decrease rate is calculated by Equation 1:

Creeping distance decrease rate (%)=$|(A-B)/A|$×100,    [Equation 1]

wherein, in the Equation 1, A and B are creeping distances of an adhesive layer prepared from the adhesive composition, when a force of 2.25 kg is applied to a polarizing plate at 25° C. for 1,000 seconds after the polarizing plate formed with the adhesive layer is attached to a glass plate and left at 35° C. and 45% RH for 24 hours and for 36 hours, respectively, wherein the isocyanate curing agent is represented by Formula 1:

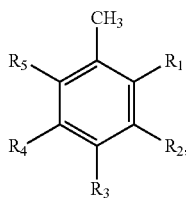

wherein, in the Formula 1, $R_1$, $R_2$, $R_3$, $R_4$, and $R_5$ are each independently selected from the group of hydrogen, $-(CH_2)_{n1}-NCO$, and $-(CH_2)_{n2}-NCO$, provided that two of $R_1$, $R_2$, $R_3$, $R_4$, and $R_5$ are $-(CH_2)_{n1}-NCO$ and $-(CH_2)_{n2}-NCO$, respectively, and n1 and n2 are each independently integers from 2 to 10, wherein the acrylic copolymer includes a copolymer of a hydroxyl group containing (meth)acrylic acid ester and (meth)acrylic acid alkyl ester.

2. The adhesive composition as claimed in claim 1, wherein the adhesive composition has a gel fraction of 70% or higher in 36 hours after formation of the adhesive layer on a film.

3. The adhesive composition as claimed in claim 1, wherein the adhesive composition has a viscosity change rate ($\Delta\eta$) of less than 10%, expressed as Equation 3:

$$\Delta\eta=|(b-a)|/a\times 100, \qquad \text{[Equation 3]}$$

wherein, in the Equation 3, a is an initial viscosity of the adhesive composition, and b is a viscosity of the adhesive composition after storage at 25° C. for 2 days.

4. A polarizing plate comprising an adhesive layer prepared from the adhesive composition as claimed in claim 1.

5. The adhesive composition as claimed in claim 1, wherein the isocyanate curing agent is 2,6-bis(butyl isocyanate)toluene.

6. An adhesive composition comprising an isocyanate curing agent and an acrylic copolymer, and having a difference in gel fraction of greater than 0 and less than 5% between gel fraction measured 4 days after formation of an adhesive layer and gel fraction measured 1 day after formation of the adhesive layer, wherein each of the gel fractions is expressed as Equation 2:

$$\text{Gel fraction (\%)}=D/C\times 100, \qquad \text{[Equation 2]}$$

wherein, in the Equation 2, C is a weight of the adhesive composition after storing a predetermined time, and D is a weight of insoluble components of the adhesive composition after storing for the predetermined time, depositing in ethyl acetate at 25° C. for 12 hours, and then drying for 12 hours in an oven at 100° C., wherein the isocyanate curing agent is represented by Formula 1:

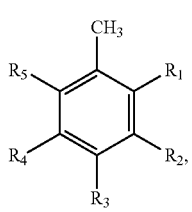

wherein, in the Formula 1, $R_1$, $R_2$, $R_3$, $R_4$, and $R_5$ are each independently selected from the group of hydrogen, $-(CH_2)_{n1}-NCO$, and $-(CH_2)_{n2}-NCO$, provided that two of $R_1$, $R_2$, $R_3$, $R_4$, and $R_5$ are $-(CH_2)_{n1}-NCO$ and $-(CH_2)_{n2}-NCO$, respectively, and n1 and n2 are each independently integers from 2 to 10, wherein the acrylic copolymer includes a copolymer of a hydroxyl group containing (meth)acrylic acid ester and (meth)acrylic acid alkyl ester.

7. The adhesive composition as claimed in claim 6, wherein the adhesive composition has a gel fraction of 70% or higher in 36 hours after formation of the adhesive layer on a film.

8. The adhesive composition as claimed in claim 6, wherein the adhesive composition has a viscosity change rate ($\Delta\eta$) of less than 10%, expressed as Equation 3:

$$\Delta\eta=|(b-a)|/a\times 100, \qquad \text{[Equation 3]}$$

wherein, in the Equation 3, a is an initial viscosity of the adhesive composition, and b is a viscosity of the adhesive composition after storage at 25° C. for 2 days.

9. A polarizing plate comprising an adhesive layer prepared from the adhesive composition as claimed in claim 6.

10. The adhesive composition as claimed in claim 6, wherein the isocyanate curing agent is 2,6-bis(butyl isocyanate)toluene.

11. An adhesive composition, comprising:
an acrylic copolymer, the acrylic copolymer including a copolymer of a hydroxyl group containing (meth) acrylic acid ester and (meth)acrylic acid alkyl ester;
an isocyanate curing agent represented by Formula 1:

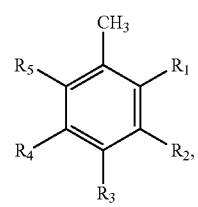

wherein, in the Formula 1, $R_1$, $R_2$, $R_3$, $R_4$, and $R_5$ are each independently selected from the group of hydrogen, $-(CH_2)_{n1}-NCO$, and $-(CH_2)_{n2}-NCO$, provided that two of $R_1$, $R_2$, $R_3$, $R_4$, and $R_5$ are $-(CH_2)_{n1}-NCO$ and $-(CH_2)_{n2}-NCO$, respectively, and n1 and n2 are each independently integers from 2 to 10; and
a crosslinking accelerator.

12. The adhesive composition as claimed in claim 11, wherein n1 and n2 are each independently integers from 3 to 6.

13. The adhesive composition as claimed in claim 11, wherein the isocyanate curing agent is present in an amount of 0.01 to 10 parts by weight, based on 100 parts by weight of the acrylic copolymer.

14. The adhesive composition as claimed in claim 11, wherein the crosslinking accelerator includes at least one selected from the group of a metallic catalyst and metal.

15. The adhesive composition as claimed in claim 11, wherein the crosslinking accelerator is present in the adhesives composition in an amount of 0.01 to 1.5 parts by weight, based on 100 parts by weight of the acrylic copolymer.

16. The adhesive composition as claimed in claim 11, further comprising a silane coupling agent.

17. A polarizing plate comprising an adhesive layer prepared from the adhesive composition as claimed in claim 11.

18. The adhesive composition as claimed in claim 11, wherein the isocyanate curing agent is 2,6-bis(butyl isocyanate)toluene.

* * * * *